US006859575B1

(12) United States Patent
Arol et al.

(10) Patent No.: US 6,859,575 B1
(45) Date of Patent: Feb. 22, 2005

(54) SELF ALIGNING OPTO-MECHANICAL CROSSBAR SWITCH

(75) Inventors: Joseph Arol, Kiryat-Ono (IL); Ze'ev Ganor, Herzelia (IL)

(73) Assignee: Sarandon (2003) Ltd., Petach-Tikva (IL)

( * ) Notice: Subject to any disclaimer, the term of this patent is extended or adjusted under 35 U.S.C. 154(b) by 19 days.

(21) Appl. No.: 10/432,944

(22) PCT Filed: Nov. 27, 2000

(86) PCT No.: PCT/IL00/00791

§ 371 (c)(1),
(2), (4) Date: May 27, 2003

(87) PCT Pub. No.: WO02/43432

PCT Pub. Date: May 30, 2002

(51) Int. Cl.$^7$ ................................................ G02B 6/26
(52) U.S. Cl. .............................. 385/17; 385/16; 385/18
(58) Field of Search ..................................... 385/16–14

(56) References Cited

U.S. PATENT DOCUMENTS

| | | | |
|---|---|---|---|
| 4,220,396 A | 9/1980 | Antell | 385/20 |
| 4,512,036 A | 4/1985 | Laor | 398/156 |
| 4,740,410 A | 4/1988 | Muller et al. | 428/133 |
| 4,955,686 A | 9/1990 | Buhrer et al. | 385/17 |
| 5,050,955 A | 9/1991 | Sjölinder | 385/17 |
| 5,177,348 A | 1/1993 | Laor | 250/201.1 |
| 5,524,153 A | 6/1996 | Laor | 385/16 |
| 5,616,980 A | 4/1997 | Zumeris | 310/323.16 |
| 5,740,190 A | 4/1998 | Moulton | 372/23 |
| 5,793,520 A | 8/1998 | Stace et al. | 359/320 |
| 5,808,383 A | 9/1998 | Kostov et al. | 310/12 |
| 5,929,542 A | 7/1999 | Ohnstein et al. | 310/40 MM |
| 5,965,968 A | 10/1999 | Robert et al. | 310/310 |
| 5,998,906 A | 12/1999 | Jerman et al. | 310/309 |
| 6,396,976 B1 * | 5/2002 | Little et al. | 385/18 |

FOREIGN PATENT DOCUMENTS

| | | |
|---|---|---|
| EP | 0 676 657 | 10/1995 |
| WO | WO 00/74153 | 12/2000 |
| WO | WO 01/32368 | 5/2001 |

OTHER PUBLICATIONS

Guckel, H.; "Micromechanisms;" Dec. 15, 1995; Philosophical Transactions of the Royal Society: Physical Sciences and Engineering; Series A, Issue No. 1703; pp. 355–366; Retrieved from Internet: <http://mems.engr.wisc.edu/publications/ROYAL.html> on Oct. 1, 2000; pp. 1–10.

Guckel, H. et al.; "Micromechanisms for Actuators via Deep X–Ray Lithography;" Feb. 27–Mar. 4, 1994; Proceedings of SPIE's 1994 Symposium on Microlithography; San Jose, CA; pp. 39–47; Retrieved from Internet: <http://mems.engr.wisc.edu/publications/SPIE94.html> on Oct. 22, 2000; pp. 1–8.

Pfeiffer, J. et al.; "MEMS Based Filter Technologies for WDM Systems;" Telecommunications Applications; mstnews 3/00; pp. 16–19.

Walker, J. A.; "Telecommunications Applications of MEMS;" Telecommunications Applications; mstnews 3/00; pp. 6–9.

(List continued on next page.)

Primary Examiner—Phan T. H. Palmer
(74) Attorney, Agent, or Firm—Fensrer & Company

(57) ABSTRACT

An optical crossbar switch comprising: a first plurality of first optic fibers having optical ends, each one of which optical ends is mounted to a different first moveable element; a second plurality of second optic fibers having optical ends, each one of which optical ends is mounted to a different second moveable element and at least one motor controllable to translate each first moveable element and each second moveable element so as to align the optical end of any first fiber and the optical end of any second fiber adjacent to and facing each other.

48 Claims, 7 Drawing Sheets

OTHER PUBLICATIONS

"Dual Excitation Multiphase Electrostatic Drive (DEMED;)" Retrieved from Internet: <http://intellect.pe.u-tokyo.ac.jp/research/es_motor/demed_e.html> on Oct, 1, 2000; pp. 1–5.

"High–Power Electrostatic Motor;" Retrieved from Internet: <http://intellect.pe.u-tokyo.ac.jp/research/es_motor/es_motor_e.html> on Oct. 1, 2000; pp. 1–2.

"Intelligent Cross–Bar Switch for Optical Telecommunications based on Micro–Mirror Array;" Retrieved from Internet: <www.ece.wpi.edu/~leblebic/switch/> on Sep. 24, 2000; pp. 1–7.

"Pulse Driven Induction Electrostatic Motor;" Retrieved from Internet: <http://www.intellect.pe.u-tokyo.ac.jp/research/es_motor/pim_e.html> on Oct. 1, 2000; pp. 1–5.

* cited by examiner

SELF ALIGNING OPTO-MECHANICAL CROSSBAR SWITCH

RELATED APPLICATIONS

The present application is a U.S. National application of PCT Application No. PCT/IL00/00791, filed Nov. 27, 2000.

FIELD OF THE INVENTION

The invention relates to crossbar switches and in particular to optical crossbar switches.

BACKGROUND OF THE INVENTION

A crossbar switch is a switch that operates to connect any one of a first plurality of signal ports to any one of a second plurality of signal ports. Generally, signal ports in the first and second pluralities of signal ports are bi-directional and any port in the crossbar switch can be used to both receive and transmit signals. The crossbar switch operates as a router that routes a signal received on any one of its ports in the first or second plurality of ports to a desired port of the second or first plurality of ports from which the signal is transmitted.

Crossbar switches are typically used, for example, for routing signals in communications networks such as a LANs and WANs and in routing data signals between processors comprised in parallel data processing systems. In many situations signals that are routed from an input port to an appropriate output port are optical signals and routing is accomplished by optical crossbar switches. An optical crossbar switch is described in an article entitled "Intelligent Crossbar Switch for Optical Telecommunications based on Micro-Mirror Array" available at URL "www.ece.wpi.edu/~leblebic/switch/" in September, 2000.

U.S. Pat. No. 5,793,520 to Stace, et al. describes an optical crossbar switch for transferring a light image from an array of input optic fibers to an array of output optic fibers. The switch uses arrays of lenslets and a spatial light modulator to perform switching of optical signals from the input fibers to the output fibers.

U.S. Pat. No. 5,524,153 to H. Laor describes a crossbar switch comprising first and second arrays of optical fibers. Any fiber in the first array can be optically aligned with any fiber in the second array by bending the fibers so as to point an end of each of the fibers so that they are optically aligned facing each other. Bending of a fiber so as to point its end in a desired direction is accomplished by two piezoelectric benders that bend the fiber near the end about two orthogonal axis. Ends of two fibers are optically aligned responsive to intensities of optical alignments signals that are generated by radiation emitting devices located at known positions with respect to each of the ends of the fibers.

SUMMARY OF THE INVENTION

An aspect of some embodiments of the present invention relates to providing an improved optical crossbar switch in which an optical signal is received at the crossbar switch via any one optic fiber in a first or second plurality of optic fibers, which are coupled to the crossbar switch. The signal is then routed by the crossbar to any desired one of the second or first pluralities of optic fibers respectively and transmitted from the crossbar switch via the desired optic fiber.

An aspect of some embodiments of the present invention relates to translating at least one of the "receiving" and "transmitting" optic fibers in order to transfer an optical signal from one to the other.

Each optic fiber in the first and second pluralities of optic fibers terminates in an optical end, hereinafter referred to as a "switch end", located in the crossbar switch. An optical signal received at the crossbar switch is switched from a fiber over which the signal is received to a fiber over which the signal is to be transmitted from the crossbar switch by translating at least one of the receiving and transmitting fibers so that their respective switch ends are optically aligned facing each other. The signal exits the switch end of the receiving fiber and is incident on the switch end of the transmitting fiber, thereby entering the transmitting fiber, and being transmitted away from the crossbar switch.

A crossbar switch, in accordance with an embodiment of the present invention, comprises a different transporter for each fiber in the first and second plurality of fibers to which the switch end of the fiber is mounted. The transporters are controllable to move and translate switch ends of the fibers so that the switch end of any fiber of the first plurality of fibers is optically aligned facing the switch end of any fiber of the second plurality of fibers. Preferably, each fiber of the second plurality of fibers is similarly mounted to a transporter, which is controllable to translate the fiber to optically align the switch end of the fiber facing any one of the switch ends of the second plurality of fibers.

In some embodiments of the present invention, when switch ends of the fibers are aligned facing each other at least one of the switch is moveable towards the other switch end so as to reduce distance between them. In some embodiments of the present invention, one or both of the switch ends is moved towards the other of the switch ends so that the switch ends are substantially contiguous.

An aspect of some embodiments of the present invention relates to providing a crossbar switch that is self-aligning so as to provide optimum alignment of switch ends of fibers between which optical signals are switched. A crossbar switch, in accordance with an embodiment of the present invention, comprises a controller that controls motion of transporters in order to align first optic fibers (i.e. fibers in the first plurality of fibers) with second optic fibers (i.e. fibers in the second plurality of fibers). Preferably, each transporter comprises a position sensor that generates signals representing coordinates corresponding to positions of the transporter along its guide rail. The controller controls motion and position of the transporter responsive to the coordinate signals.

Preferably, the controller comprises a memory and for each pair of first and second optic fibers, the memory is stored with coordinates, hereinafter referred to as "alignment coordinates", for their respective transporters for which the fibers are aligned. To align a pair of optic fibers, the controller positions their transporters at the alignment coordinates corresponding to the pair of fibers.

According to an aspect of some embodiments of the present invention, when transporters are positioned at alignment coordinates to align two optic fibers, the controller optimizes the positions so that a maximum portion of light emitted from one of the fibers is collected by the other fiber. In some embodiments of the present invention, if an optimum position for a transporter differs from a corresponding alignment position stored in the memory, the alignment position is updated responsive to the optimum position.

In some embodiments of the present invention, the controller controls position of aligned fibers so that the collected portion of energy is equal to a desired portion, which is less than maximum. The controller functions thereby to attenuate signals that are switched between aligned fibers.

It is to be noted that alignment of optical components comprised in optical devices, such as optical switches, is often an expensive and labor intensive task. For crossbar switches in accordance with embodiments of the present invention however, alignment problems are reduced and assembly tolerances may be relaxed. As long as transporters of any pair of first and second fibers can be positioned along their respective guide rails or slots so that their switch ends are optically aligned, alignment coordinates exist for the pair of fibers and the controller can find and optimize these alignment coordinates.

In some embodiments of the present invention, transporters and guide rails are "macroscopic" and have dimensions conveniently measured in millimeters. In some embodiments of the present invention, the crossbar switch is a "micro-crossbar" switch comprising transporters, guide rails and other components having dimensions conveniently measured in micrometers. Components of a micro-crossbar switch, in accordance with an embodiment of the present invention, are fabricated and assembled using microfabrication techniques.

There is therefore provided in accordance with an embodiemnt of the present invention, an optical crossbar switch comprising: a first plurality of first optic fibers having optical ends, each one of which optical ends is mounted to a different first moveable element; a second plurality of second optic fibers having optical ends, each one of which optical ends is mounted to a different second moveable element; and at least one motor controllable to translate each first moveable element and each second moveable element so as to align the optical end of any first fiber and the optical end of any second fiber adjacent to and facing each other.

Optionally, the at least one motor is controllable to move the optical end of any first fiber relative to the optical end of any second: fiber from a position at which the optical end of the first fiber is not adjacent to the optical end of the second fiber to a position at which the optical ends of the two fibers are adjacent.

Optionally, when the optical end of a first fiber is aligned adjacent to and facing the optical end of a second fiber the at least one motor is controllable to translate at least one of the optical ends towards and away from the other optical end.

In some embodiments of the present invention the at least one motor is controllable to translate at least one of the optical ends of the aligned first and second fibers so that the optical ends are substantially touching.

In some embodiments of the present invention the optical crossbar switch comprises a controller that controls the at least one motor.

In some embodiments of the present invention the optical crossbar switch comprises a position sensor for each moveable element that generates signals representing coordinates corresponding to positions of the moveable element and transmits the signals to the controller. Optionally the controller controls position of the moveable element responsive to the coordinate signals.

In some embodiments of the present invention the optical crossbar switch comprises a memory. Optionally, for each pair of first and second fibers, the memory is stored with position coordinates for the first and second moveable elements to which the fibers are respectively connected, which position coordinates define positions for the movable elements for which the first and second fibers are substantially aligned. Optionally, to align a particular first fiber with a particular second fiber, the controller positions the moveable elements to which the particular fibers are mounted at positions corresponding to the coordinates stored in the memory for which the two particular fibers are substantially aligned.

In some embodiments of the present invention the optical crossbar switch comprises a photosensor coupled to each fist optic fiber that transmits signals responsive to intensity of light in the fiber to the controller. Optionally, the controller controls the position of the first moveable element to which the first fiber is mounted responsive to signals received from the photosensor.

In some embodiments of the present invention the optical crossbar switch comprises a photosensor coupled to each second optic fiber that transmits signals responsive to intensity of light in the fiber to the controller. Optionally, the controller controls the position of the second moveable element to which the second fiber is mounted responsive to signals received from the photosensor.

In some embodiments of the present invention, when the controller aligns a particular first fiber with a particular second fiber, the controller controls motion of a moveable element of at least one of the particular fibers responsive to signals from the photosensor attached to at least one of the particular fibers to optimize a position of at least one of the moveable elements so as to maximize a portion of light emitted from one of the fibers that is collected by the other fiber.

Optionally, if a coordinate of an optimum position for a moveable element to which one of the particular fibers is attached differs by an amount greater than a predetermined amount from a stored coordinate of the moveable element for which the particular fibers are aligned, the controller adjusts the stored coordinate responsive to the coordinate of the optimum position. Optionally, the controller replaces the stored coordinate with the coordinate of the optimum position.

In some embodiments of the present invention, when the controller aligns a particular first fiber with a particular second fiber, the controller uses signals from the photosensor attached to at least one of the particular fibers to determine a position of at least one of the moveable elements to which the particular fibers are attached so that a desired portion, less than a possible maximum, of light emitted from one of the fibers is collected by the other fiber.

In some embodiments of the present invention, each first moveable element is mounted to a guide rail in a first array of first guide rails along which the first moveable element moves.

In some embodiments of the present invention each second moveable element is mounted to a guide rail in a second array of second guide rails along which the first moveable element moves. Optionally, the first guide rails are rectilinear. Optionally, the first array of guide rails is planar and the first guide rails are parallel. Optionally, the second guide rails are rectilinear. Optionally, the second array of guide rails is planar and the second guide rails are parallel.

In some embodiments of the present invention the planes of the first and second arrays of guide rails are parallel and the optical ends of the first and second fibers face the second and first rail arrays respectively. Optionally, the first and second fibers are mounted to their respective moveable elements so that directions along which optical signals propagate after exiting optical ends of the fibers are substantially parallel. Optionally, the first guide rails are angled with respect to the second guide rails so that a projection normal to the plane of the second guide rail array of any guide rail in the first guide rail array shadows each of the guide rails in the second guide rail array.

In some embodiments of the present invention, each guide rail in the first guide rail array lies on a same cylindrical surface and the guide rail is parallel to the axis of rotation of the cylindrical surface. Optionally, each second guide rail is an annulus having an axis of rotation that is coincident with the axis of rotation of the cylindrical surface. Optionally, all the annuli are the same size.

In some embodiments of the present invention, the at least one motor comprises a motor mounted to each moveable element and the motor applies force between the moveable element and its guide rail to move the moveable element along the guide rail. Optionally, the at least one motor comprises a piezoelectric motor.

In some embodiments of the present invention each first movable element comprises a slider mounted in a groove formed in a first surface along which groove the slider moves. Optionally each second movable element comprises a slider mounted in a groove formed in a second surface along which groove the slider moves. Optionally, the first and second surfaces are planar parallel surfaces. Optionally, the grooves in the first and second surfaces are rectilinear. Optionally, the grooves in a same surface are parallel and the grooves in the first surface are angled with respect to the grooves in the second surface so that a projection normal to the second surface of any groove in the first surface shadows each of the grooves in the second surface. Optionally, the grooves in the first surface are orthogonal to the grooves in the second surface.

In some embodiments of the present invention, the optical crossbar switch comprises a linear gear positioned near and parallel to each groove. Optionally, the at least one motor comprises a motor mounted to each slider, said motor having a gear that engages the linear gear so that when the motor rotates the gear, the slider moves along the groove.

In some embodiments of the present invention, the slider comprises a thin rectangular plate having long and short edges and two planar face surfaces. Optionally, the at least one motor comprises a piezoelectric motor coupled to a long edge surface of the plate.

In some embodiments of the present invention, optical ends of the fibers are lensed.

In some embodiments of the present invention the optical crossbar a lens for each pair of fibers comprising a first fiber and a second fiber, which lens is located between positions of the optical ends of the fibers at which the optical ends of the fibers are aligned facing each other.

In some embodiments of the present invention, the at least one motor and first and second moveable elements are fabricated using micromachining techniques.

There is further provided, in accordance with an embodiment of the present invention, an optical crossbar switch comprising: a first plurality of first optic fibers having optical ends, each one of which optical ends is mounted to a different first micromachined moveable element; a second plurality of second optic fibers having optical ends, each one of which optical ends is mounted to a different second micromachined moveable element; and at least one micromachined motor controllable to translate each first moveable element and each second moveable element so as to align the optical end of any first fiber and the optical end of any second fiber adjacent to and facing each other.

Optionally, a maximum dimension of the at least one motor is less than 300 microns. Optionally, a maximum dimension of the first and second moveable elements perpendicular to their directions of motion are less than 300 microns.

BRIEF DESCRIPTION OF FIGURES

A description of examples of embodiments of the present invention that references figures attached hereto is given below. In the figures, identical structures, elements or parts that appear in more than one figure are generally labeled with the same numeral in all the figures in which they appear. Dimensions of components and features shown in the figures are chosen for convenience and clarity of presentation and are not necessarily shown to scale. The figures are listed below.

DETAILED DESCRIPTION OF EXAMPLES OF EMBODIMENTS

Figure 1:
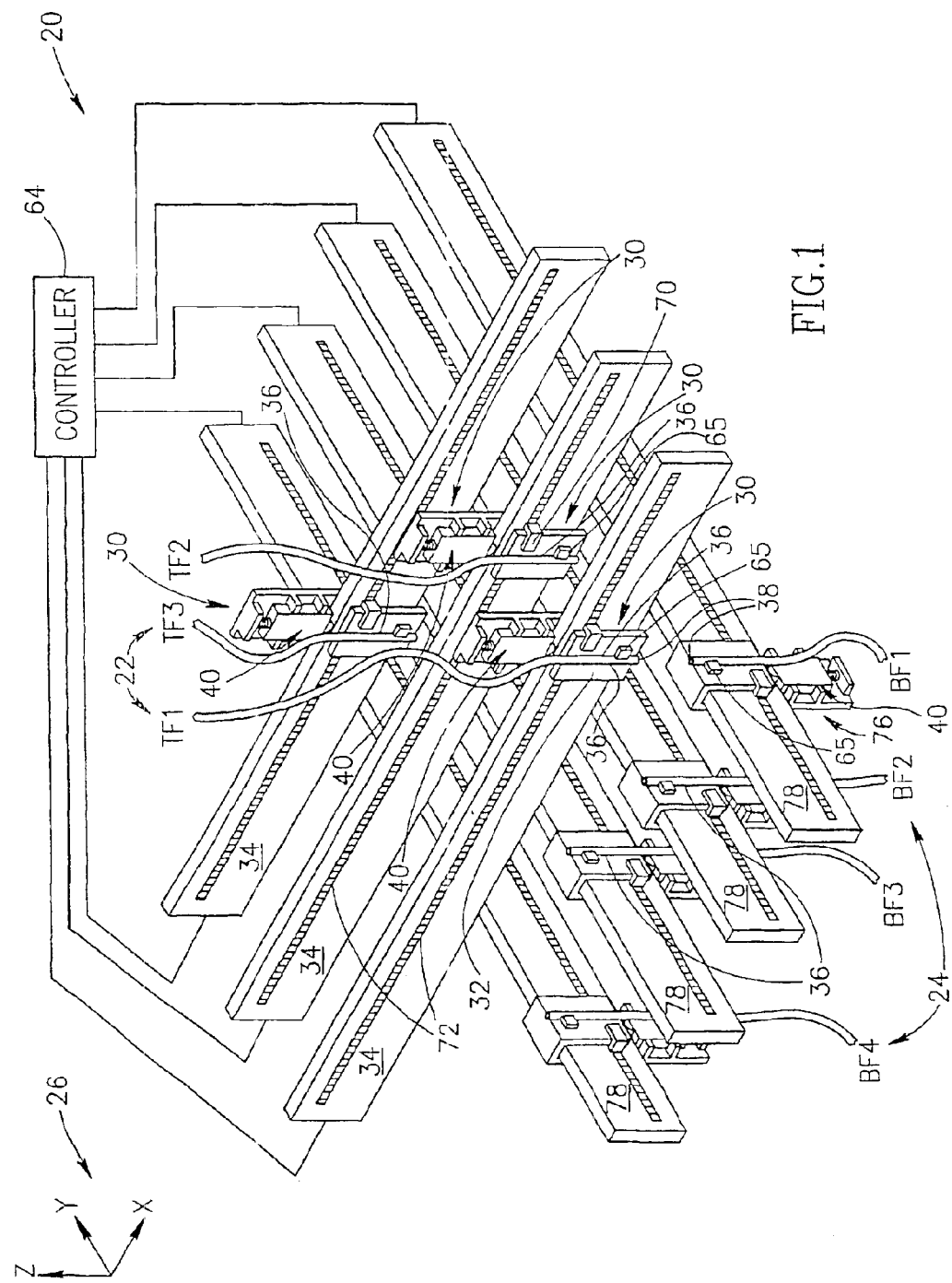
FIG. 1 schematically shows a crossbar switch, in accordance with an embodiment of the present invention.

FIG. 1 schematically shows an optical crossbar switch 20, in accordance with an embodiment of the present invention. By way of example, crossbar switch comprises a first plurality of three optic fibers 22, hereinafter referred to as "top optic fibers" 22, and a second plurality of four optic fibers 24, hereinafter referred to as "bottom optic fibers" 24. Crossbar switch 20 is therefore a "3×4" crossbar switch configured to optically connect any one of the 3 top optic fibers 22 to any one of the 4 bottom optic fibers 24 and transmit an optical signal from one to the other of the optically connected fibers. Optic fibers 22 are individually distinguished by alphanumerics TF1 through TF3 and bottom optic fibers 24 are individually distinguished by alphanumerics BF1–BF4.

For convenience of presentation, positions and orientations of components and elements of crossbar switch 20 are referenced with respect to a coordinate system 26. To prevent clutter, only some of identical features of crossbar switch 20 are labeled with reference numerals.

Each top optic fiber 22 is optionally mounted to a front panel 32 of a "top" transporter 30 that is mounted to a "top" guide rail 34. Top guide rails 34 are optionally parallel to the x-axis of coordinate system 26 and, by way of example, are coplanar and have a rectangular cross-section. The plane of top guide rails 34 is parallel to the xy plane. Each optic fiber 22 is mounted to its respective top transporter 30 so that a section 36 of the optic fiber near an end 38, i.e. an optical switch end 38, of the optic fiber is parallel to the z-axis and the switch end faces the minus z direction. As a result, an optical signal exiting switch end 38 of the optic fiber 22 propagates substantially only in the negative z direction.

Figure 2:
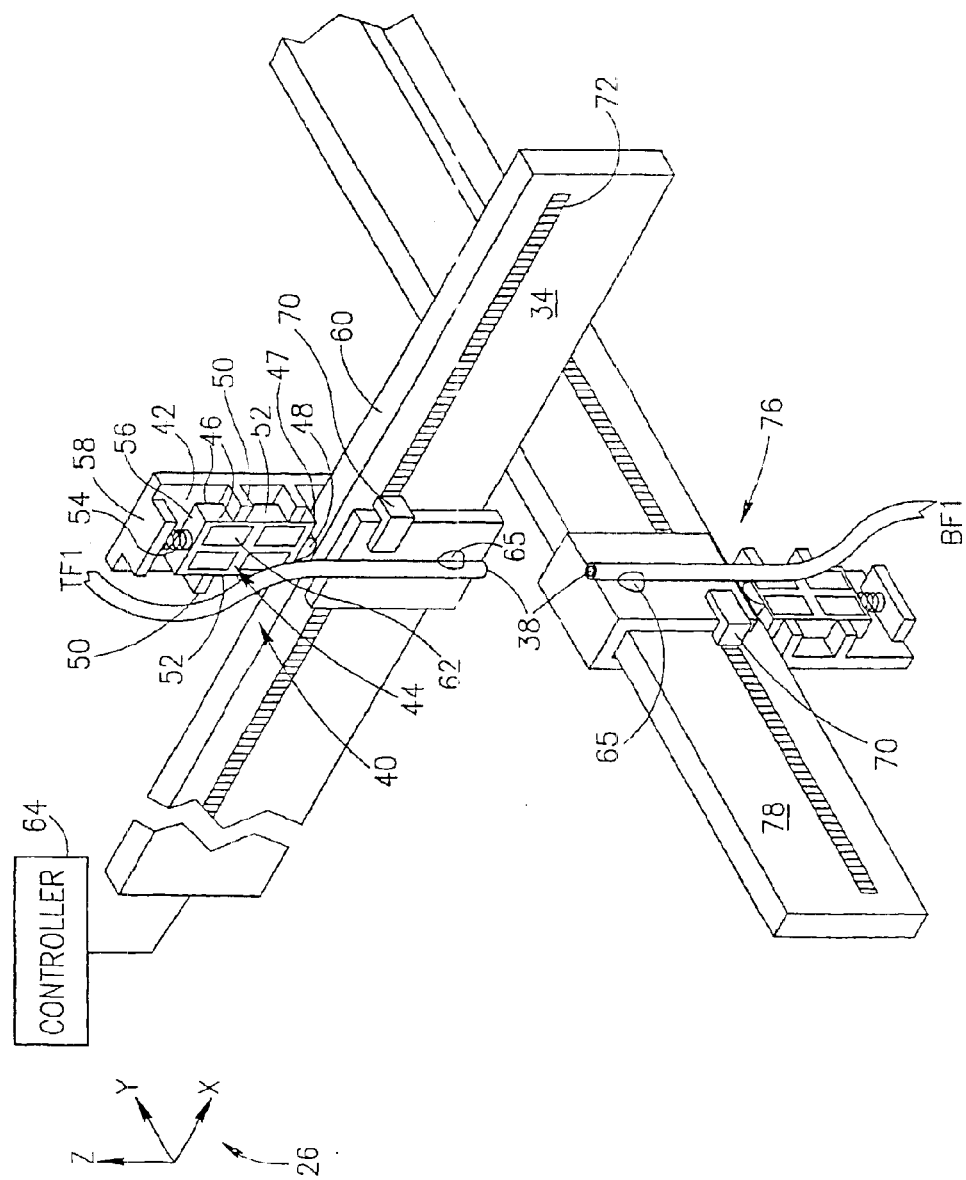
FIG. 2 schematically shows details of the crossbar switch shown in FIG. 1.

Details and features of transporter 30 and other elements of crossbar switch 20 are more easily seen in a magnified view of a region of crossbar switch 20 shown in FIG. 2. The region of crossbar switch 20 shown in FIG. 2 is a neighborhood of transporter 30 to which optic fiber TF1 is mounted.

Referring to FIG. 2, a piezoelectric motor 40 is optionally mounted to a back panel 42 of each transporter 30. In some embodiments of the present invention piezoelectric motor 40 is of a type described in U.S. Pat. No. 5,616,980 to Zumeris et al, or in PCT Applications PCT/IL99/00288 and PCT/IL99/00576 entitled "Multilayer Piezoelectric Motor", the disclosures of which are incorporated herein by reference.

Piezoelectric motor 40 comprises a thin rectangular piezoelectric vibrator 44 having two face surfaces 46, only one of which is shown, and, optionally, a friction nub 48 mounted to a short edge 47 of the vibrator. Piezoelectric motor 40 is mounted to back panel 42 using techniques known in the art and is shown, by way of example, being held in place by four tangs 50 (only three of which are shown). Tangs 50 press on long edge surfaces 52 of piezoelectric motor 40, preferably, at nodal regions along the edge surfaces of the motor. A suitable spring 54 or other source of resilient force is coupled between a short edge surface 56 of piezoelectric motor 40 and a lip 58 that extends from back panel 42. Spring 54 operates to resiliently urge piezoelectric motor 40 towards guide rail 34 so that friction nub 48 presses on an edge surface 60 of guide rail 34.

Vibrator 44 has four quadrant electrodes 62 on one face surface 46 and a single large electrode (not shown) on the other face surface 46 of the vibrator. A controller 64 electrifies quadrant electrodes 62 to generate appropriate vibrations in friction nub 48 that move transporter 36 along its guide rail 34 selectively in either the positive or the negative x direction. Methods and electrification configurations for electrifying quadrant electrodes 62 to provide desired vibrations in friction nub 48 are described in U.S. Pat. No. 5,616,980 and in PCT applications PCT/IL99/00288 and PCT/IL99/00576, referenced above.

A position sensing device 70, such as an optical magnetic or capacitive position sensor, is preferably mounted to each top transporter 30 and transmits signals responsive to coordinates of positions of the transporter along its guide rail 34 to controller 64. In FIGS. 1 and 2, position sensing device 70 is shown as an optical position sensing device that generates coordinate position signals responsive to fiducial markings 72 on guide rail 34. Controller 64 uses the coordinated signals to control motion and position of top transporter 30.

Referring again to FIG. 1, bottom optic fibers 24 are, optionally, similarly mounted to "bottom" transporters 76 that are moved back and forth by piezoelectric motors 40 along parallel, optionally coplanar "bottom" guide rails 78. However, unlike top guide rails 34 that are parallel to the x-axis, bottom guide rails 34 are preferably parallel to the y-axis and motion of a transporter 76 along its bottom guide rail 78 is, selectively, in either the positive or negative y directions. In addition, optical switch ends 38 of bottom optic fibers 24 face in the positive z direction and optical signals exiting a switch end 38 of a bottom optic fiber 24 propagate substantially in the positive z direction. As in the case of top transporters 30 mounted to top guide rails 34, motion of bottom transporters 76 mounted to bottom guide rails 78 is controlled by controller 64.

The length and position of each top guide rail 34 is such that a projection of the guide rail in the negative z direction shadows all of bottom guide rails 78. A projection of each bottom guide rail 78 in the positive z direction therefore also shadows all top guide rails 34. As a result, controller 64 can control the position of any particular top transporter 30 and any particular bottom transporter 76 so that optical switch ends 38 of their respective optic fibers are aligned opposite each other. When aligned, an optical signal exiting one of the switch ends 38 of the aligned optic fibers will be incident on the switch end of the other optic fiber and enter the other optic fiber. In FIGS. 1 and 2 top optic fiber TF1 is aligned with bottom optic fiber BF1.

Preferably, controller 64 comprises a memory in which for each pair of top and bottom optic fibers TFi and BFj, "alignment" coordinates for positions of their transporters 30 and 76 along their respective guide rails 34 and 78 are stored for which the fibers are aligned. (Letters i and j in "TFi" and "BFj" represent the numerals that specify particular optic fibers of the top and bottom fibers 22 and 24). To align a particular top fiber TFi with a particular bottom fiber BFj the controller moves their transporters 30 and 76 to the appropriate alignment coordinates stored in the memory.

In accordance with some embodiments of the present invention, when controller 64 aligns two optic fibers TFi and BFj by positioning their transporters at appropriate alignment coordinates, the controller optimizes positions of the transports so that a maximum portion of light emitted by one of the fibers is collected by the other fiber.

To optimize alignment positions, in some embodiments of the present invention, a photosensor 65 is coupled to each optic fiber TFi, BFj, using methods known in the art, so that the photosensor senses intensity of light entering or exiting switch end 38 of the optic fiber. For example, photosensor 65 may sense leakage of light through cladding of the optical fiber. Signals generated by photosensor 65 responsive to light that it senses are transmitted to controller 64. When controller 64 aligns a top optic fiber TFi to a bottom optic fiber BFj, the controller uses signals from their respective photosensors 65 to determine what portion of light exiting one of the fibers is collected by the other fiber. Controller 64 adjusts positions of transporters 30 and 76 of the optic fibers TFi and BFj to maximize the collected portion.

In some embodiments of the present invention, if a coordinate of an optimized position of a transporter 30 or 76 differs from the corresponding alignment coordinate stored in the memory by an amount greater than a predetermined amount, the controller updates the alignment coordinate. In some embodiments of the present invention updating is accomplished by replacing the stored coordinate with the coordinate of the optimum position.

In some embodiments of the present invention, controller 64 continuously adjusts positions of transporters 30 and 76 of aligned optic fibers TFi and BFj during optical signal transmission responsive to signals from their respective photosensors 65 to maintain optimum signal transmission between the fibers.

In some embodiments of the present invention, sections 36 of optic fibers 22 and 24 are mounted in fixed positions to their respective transporters. The positions of switch ends 38 of the optic fibers 22 and 24 are such that when controller 64 aligns a top optic fiber 22 opposite a bottom optic fiber 24, their respective switch ends are optionally separated by a distance that is less than a diameter of the core of the optic fibers. Preferably, the separation distance is less than 2 microns. More preferably, the separation distance is less than 1.5 microns. Most preferably, the separation distance is less than 1 micron.

In some embodiments of the present invention, switch end 38 of each fiber is mounted with a collimating lens (not shown). For such embodiments, efficient switching of signals between two optic fibers having aligned switch ends can be obtained for separation distances that are greater than separation distances noted above. For "lensed" fibers, preferably, separation distances are less than 3 microns.

In some embodiments of the present invention a lenslet is used to focus light exiting one of a pair of aligned top and bottom optic fibers onto the switch end of the other of the pair of optic fibers.

Figure 3:
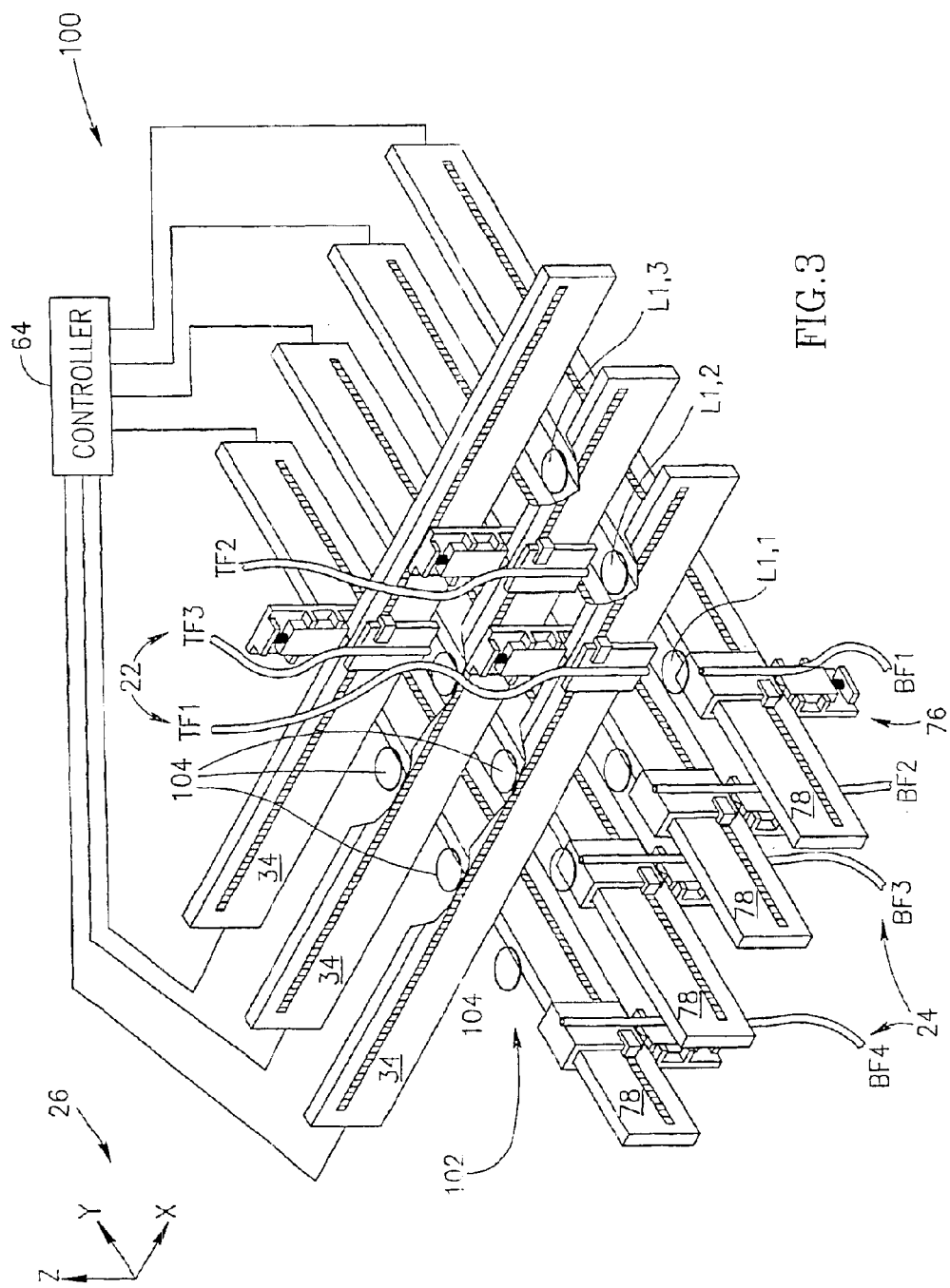
FIG. 3 schematically shows a crossbar switch comprising an array of lenslets, in accordance with an embodiment of the present invention.

FIG. 3 schematically shows a crossbar switch 100, in accordance with an embodiment of the present invention, in which lenslets are used to transmit light between optic fibers in aligned pairs of optic fibers. Crossbar switch 100 is similar to crossbar switch 20 shown in FIGS. 1 and 2 and comprises, like crossbar switch 20, top and bottom optic fibers 22 and 24 mounted to transporters 30 and 76 respectively that move along top and bottom guide rails 34 and 78. However, crossbar switch 100 comprises, in addition, a planar array 102 of N rows and M columns of lenslets 104, where N is the number of top optic fibers 22 and M is the number of bottom optic fibers 24 in crossbar switch 100. The plane of lenslet array 102 is parallel to and located between the planes of top guide rails 34 and bottom guide rails 78, i.e. the plane is parallel to the xy plane and located between the top and bottom guide rails. Rows of lenslets 104 in array 102 are parallel to top guide rails 34 (i.e. parallel to the x-axis) and columns of the lenslets are parallel to bottom guide rails 78 (i.e. parallel to the y-axis). Each row of lenslets 104 is substantially directly under a top guide rail 34 and each column of lenslets 104 is substantially directly above a bottom guide rail 78.

In FIG. 3, parts of some of top guide rails 34 are cut away to show lenslets 104. By way of example crossbar switch 100 is shown with three top optic fibers 22 and four bottom optic fibers 24. Let the lenslet in the i-th row and j-th column of lenslet array 102 be represented by $L_{ij}$. To align a particular top optic fiber $TF_i$ with a particular bottom optic fiber $BF_j$, controller 64 aligns the top and bottom optic fibers with lenslet $L_{ij}$.

In some crossbar switches, in accordance with embodiments of the present invention, top optic fibers 22 and/or bottom optic fibers 24 are mounted to their transporters so that their switch ends 38 are moveable back and forth in directions perpendicular to the planes of their guide rails. When a "moveable" optic fiber 22 or 24 is being moved along its guide rail or is not being used to transmit a signal, preferably, the optic fiber is moved so as to "retract" its switch end towards the plane of its rail array. When a top fiber 22 and a bottom optic fiber 24 are aligned, distance between their switch ends is reduced, or the switch ends are brought substantially into contact with each other, by moving one or both of the optical fibers toward each other.

Figure 4:
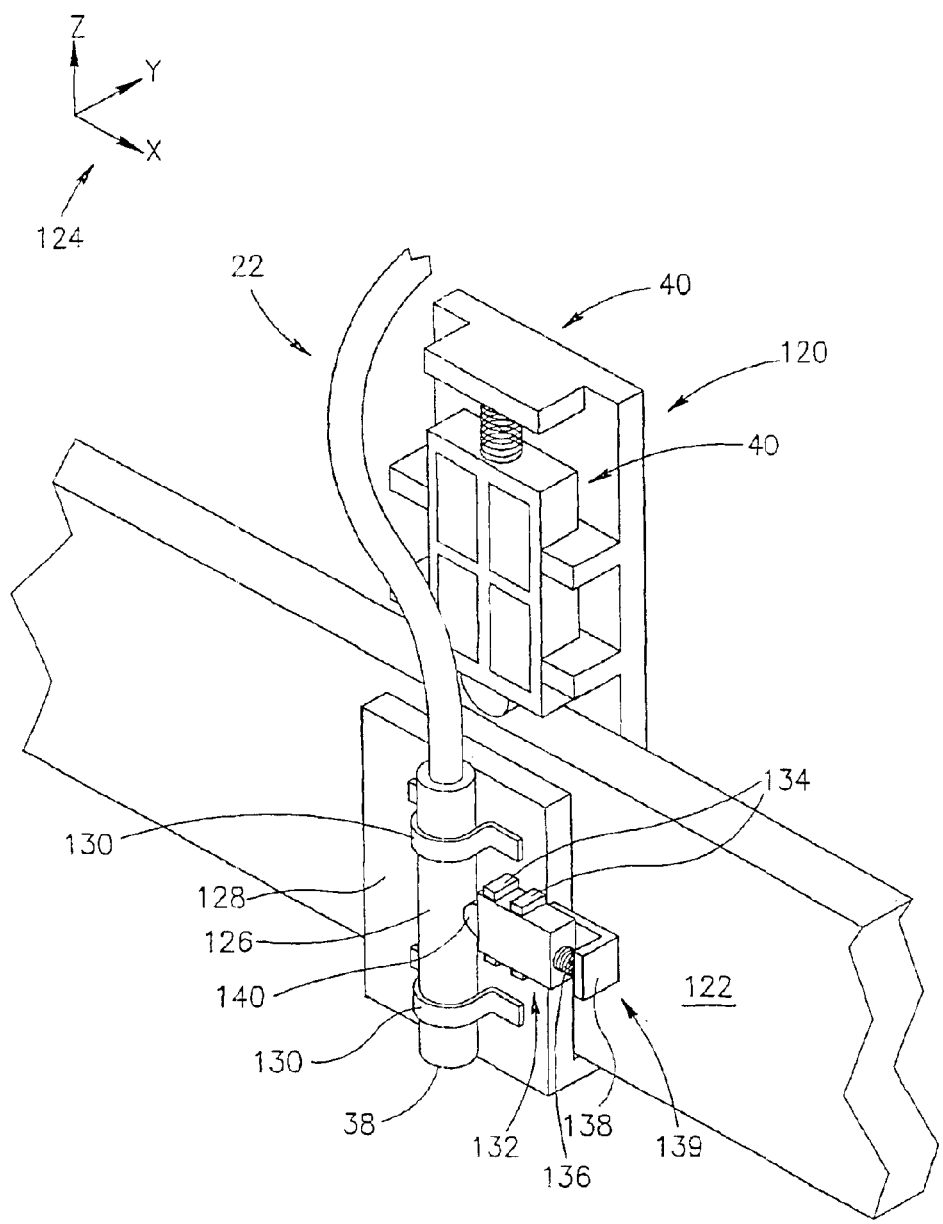
FIG. 4 schematically shows an optic fiber mounted to a transporter so that the switch end of the fiber is moveable, in accordance with an embodiment of the present invention.

FIG. 4 schematically shows a transporter 120 in which a top optic fiber 22 having a switch end 38 is mounted to the transporter so that the switch end is moveable, in accordance with an embodiment of the present invention. Transporter 120 is mounted to a top guide rail 122, only a part of which is shown. Guide rail 122 is parallel to the x-axis of a coordinate system 124 and the plane of an array of top guide rails to which guide rail 122 belongs is parallel to the xy plane of the coordinate system 124.

In some embodiments of the present invention, a region of optic fiber 22 near its optical switch end 38 is contained in a rigid sleeve 126. Sleeve 126 is coupled to a front panel 128 of transporter 120, optionally by two brackets 130 that permit sleeve 126 to move substantially only perpendicular to the plane of the top guide rails, i.e. parallel to the z-axis of coordinate system 124.

Movement and positioning of switch end 38 of optic fiber 22 is optionally accomplished by a piezoelectric motor 132 also mounted to front panel 128. Piezoelectric motor 132 is, by way of example, similar to piezoelectric motor 40, but is generally smaller than piezoelectric motor 40. Piezoelectric motor 132 is held in position, optionally, by tangs 134 and is urged towards sleeve 126 by a spring element 136 located between the motor and a lip 138 of a suitable bracket 139 so that a friction nub 140 of the motor presses on sleeve 126. Vibrations generated in friction nub 140 when piezoelectric motor 132 is appropriately excited, move sleeve 126 and thereby optical switch end 38 selectively up or down parallel to the z-axis. Preferably sleeve 126 is formed from a hard wear resistant material such as such as steel, Alumina or a high impact plastic.

It should be noted that motion of switch end 38 of optic fiber 22 along the z direction can be provided by a motor and/or actuator other than a piezoelectric motor. For example, optic fiber 22 may be coupled to an actuator formed from a memory shaped alloy, which when heated changes shape and displaces switch end 38 in the positive z direction from a first position to a second position. When cooled, the actuator returns to its unheated shape and moves switch end 38 in the negative z direction from the second position back to the first position. Heating of the alloy can be effected, for example, by an appropriate electric current or by heat transfer from piezoelectric motor 40.

Whereas transporters in FIGS. 1–4 are shown driven along their respective guide rails by piezoelectric motors, other types of motors and various methods of coupling such motors to guide rails may be used to move the transporters. For example, each guide rail may be formed with gear teeth along an edge thereof and a rotary electric motor that drives a gear that meshes with the gear teeth on the guide rail can be used to move the transporter along the guide rail.

Figure 5:
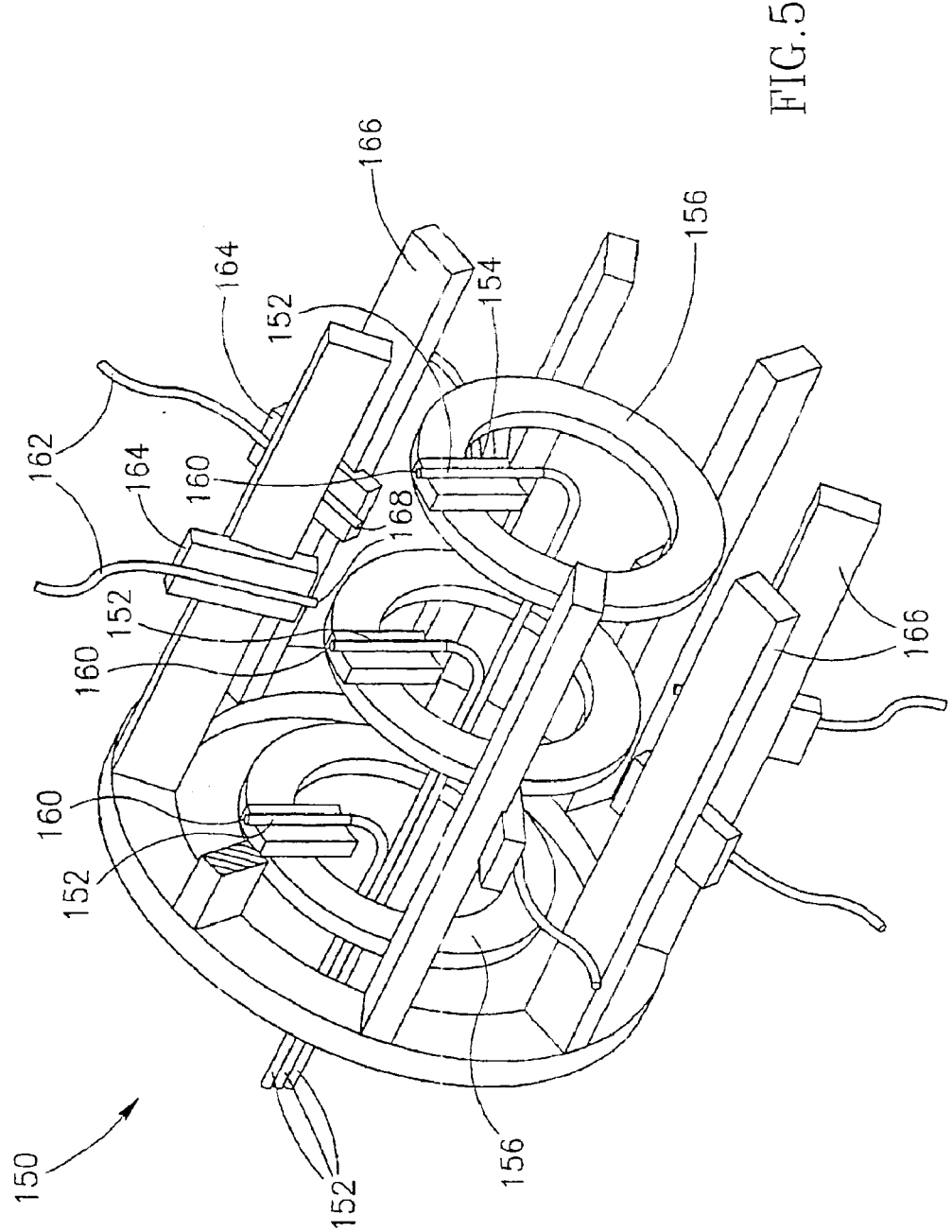
FIG. 5 schematically shows another crossbar switch in accordance with an embodiment of the present invention.

FIG. 5 shows a very simplified schematic view of another crossbar switch 150, in accordance with an embodiment of the present invention.

Crossbar switch 150 comprises a first plurality of optic fibers 152, each of which is mounted to a transporter 154 that travels on an annular guide rail 156 clockwise or counterclockwise about guide rail 156. Guide rails 156 have a common axis of rotation 158 and each optic fiber 152 is fastened to its transporter 154 so that a switch end 160 of the fiber points away from axis of rotation 158 in a radial direction. Each optic fiber 162 of a second plurality of optic fibers 162 is mounted to a transporter 164 that travels back and forth along a linear guide rail 166. Linear guide rails 166 are parallel to axis of rotation 158 and each optic fiber 162 has a switch end 168 that faces axis of rotation 158 in a radial direction. Motion of transporters 154 and 164 is controlled by a controller (not shown). By way of example, crossbar switch 150 comprises three "annular mounted" optic fibers 152 and eight "linear mounted" optic fibers 162.

The controller can align switch end 168 of any optic fiber 162 mounted on a linear guide rail 166 opposite switch end 160 of any optic fiber 152 mounted on an annular guide rail 156 by moving their transporters 164 and/or 154 to appropriate positions on their guide rails 166 and 156.

Figure 6:
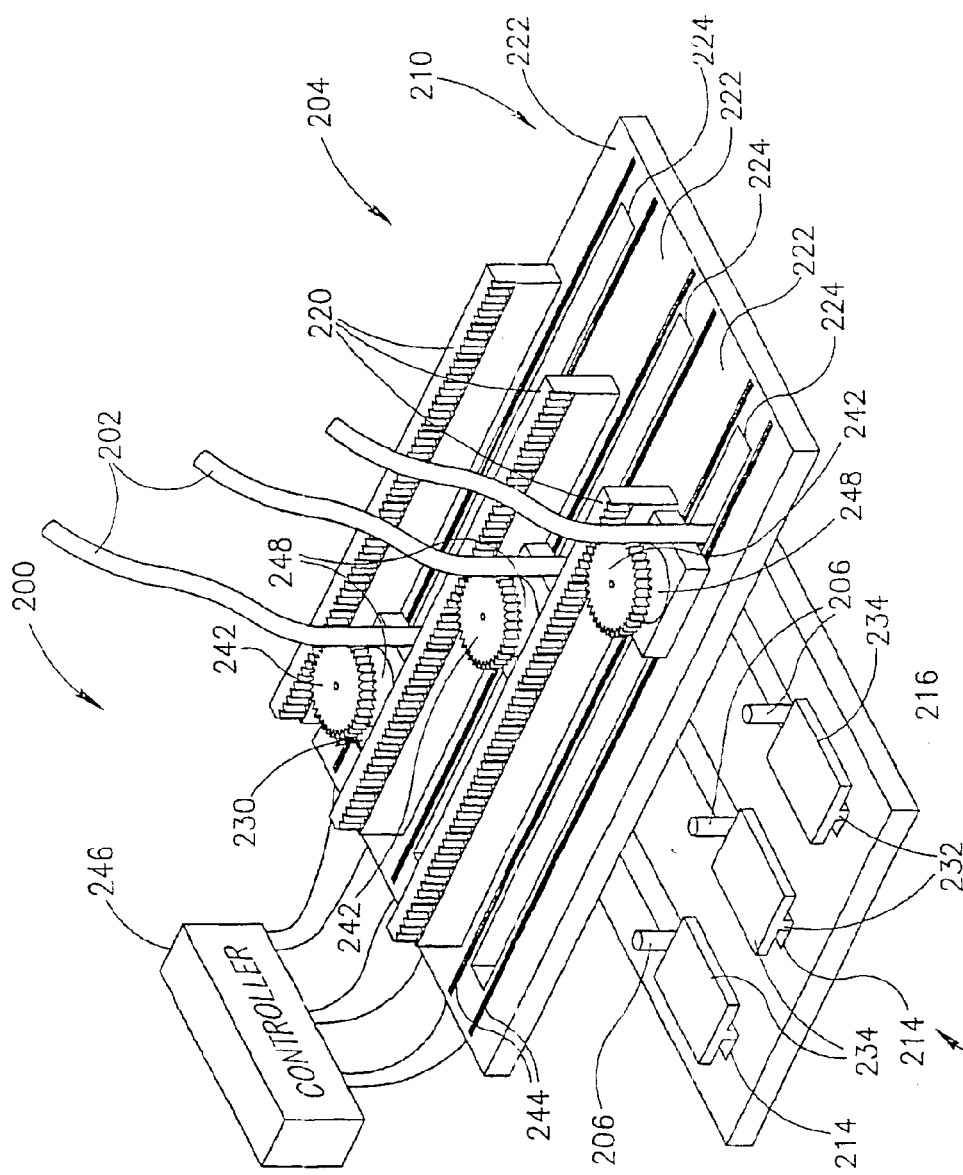
FIG. 6 schematically shows a crossbar switch suitable for fabrication using micromachining processes, in accordance with an embodiment of the present invention.

FIG. 6 schematically shows a crossbar switch 200 suitable for being produced using microfabrication processes (e.g. MEMS fabrication processes) known in the art. Microfabrication techniques are described and illustrated in a book entitled "Fundamentals of Microfabrication" by Marc Madou, CRC Press Boca Raton, Fla. 1997, the disclosure of which is incorporated herein be reference.

Crossbar switch 200, is by way of example a 3×3 crossbar switch comprising three top optic fibers 202 and 3 bottom optic fibers 206. Top optic fibers 202 are mounted to a top fiber positioning device 204 and bottom optic fibers 206 are similarly mounted to a bottom fiber positioning device 208. Top and bottom positioning devices 204 and 208 are, optionally, identical. In FIG. 6 top positioning device 204 is shown from the top and bottom fiber positioning device 208 is shown from the bottom. Structure and features of fiber positioning devices 204 and 208 will be discussed with reference mainly to top fiber positioning device 204. Structure and features of fiber positioning devices 204 and 208 that are discussed, which are shown in the view of bottom fiber positioning device 208 but not in the view of top fiber positioning device 204 will be referenced to bottom positioning device 208.

Top positioning device 204 comprises a guide plate 210 formed with guide slots 212 from a suitable substrate material. (Corresponding guide slots 214 in a guide plate 216 of bottom fiber positioning device 208 are preferably orthogonal to guide slots 212 in guide plate 210 of top fiber positioning device 204.) A linear gear 220 formed on guide plate 210 adjacent to and parallel to each guide slot 212 extends along the guide slot for most of the guide slot's length. However, guide slot 212 is longer than linear gear 220 and a region 222 of guide plate 210 near an end 224 of the guide slot does not lie along a portion of the linear gear.

A sliding transporter 230, hereinafter referred to as "transport slider 230" is mounted in each guide slot 212. Each transport slider 230 is moveable back and forth along its guide slot 212 and comprises a keel 232 that fits into the guide slot. A foot 234 at the end of keel 232 prevents the slider 230 from slipping out of guide slot 212. Keels 232 and feet 234 are shown in the view of bottom fiber positioning device 208.

A top fiber 236 is attached to each slider 230 so that the fiber passes through the slider's guide slot 212 and a switch end (not shown) of the fiber faces guide plate 216 of bottom fiber positioning device 208.

A rotary micromachined "MEMS" motor 240 is formed on top of each slider 230 and a gear 242, which is coupled to the motor's rotor (not shown) is micromachined on top of the motor. Different types of micromachined rotary motors are known in the art and may be used in the practice of the present invention. For example, motor 240 may be a piezoelectric rotary motor similar to a type described in U.S. Pat. No. 5,965,968, the disclosure of which is incorporated herein by reference. Gear 242 meshes with linear gear 220 at the side of slot 212 in which slider 230 is mounted. Motor 240 is controllable to rotate gear 242 either clockwise or counterclockwise and thereby move slider 230 back and forth along guide slot 212. Power and control lines 244 for motor 240 are preferably formed on guide plate 210 parallel to guide slot 212. Contact to power and control lines 244 are made via suitable sliding contacts (not shown) formed in slider 230. Power and control lines 244 for each motor 240 are connected to a controller 246. Controller 246 controls motor 240 via control and power lines 244 to move and position slider 230 along its guide slot 212 and thereby position the top fiber 202 attached to the slider so that the top fiber is aligned with any desired bottom optic fiber 206.

Transport slider 230, rotary motor 240 and gear 242 are micromachined in region 222 near each guide slot 212 that does not have a portion of linear gear 220 thereon. After slider 230, motor 240 and gear 242 are fabricated, the slider is pushed towards linear gear 220 so that gear 242 and linear gear 220 mesh. Thereafter, motion of slider 230 is controlled by motor 240. Micromachining slider 230, motor 240 and gear 242 in a region removed from where linear gear 220 is micromachined contributes to efficiency and simplification of their production.

By way of example, assume that micromachined motor 240 has a radius of about 100 microns, that linear gear has a thickness of about 40 microns and that guide slots 212 are spaced apart about 150 microns center to center. A crossbar switch, in accordance with an embodiment of the present invention, capable of routing any of 1000 inputs to any of 1000 outputs would then have dimensions parallel to guide slots 212 of about 15 cm.

It should be noted that whereas micromachined crossbar switch 200 is shown using rotary motors to move and position optic fibers, other types of motors can be used to move and position optic fibers in crossbar switches, in accordance with embodiments of the present invention. For example, sliders similar to sliders 230 shown in FIG. 6 can be moved by linear MEMS motors. A description of a linear motor is available in a November 2000 edition of URL site, "http://www.intellect.pe.u-tokyo.ac.jp/research/es_motor/pime_e.html", the disclosure of which is incorporated herein by reference.

It should be further noted that whereas crossbar switch 200 is designed for production using microfabrication processes, a similar "macro-sized" crossbar switch in accordance with an embodiment of the present invention can be produced using conventional "macroscopic" fabrication procedures.

Figure 7:
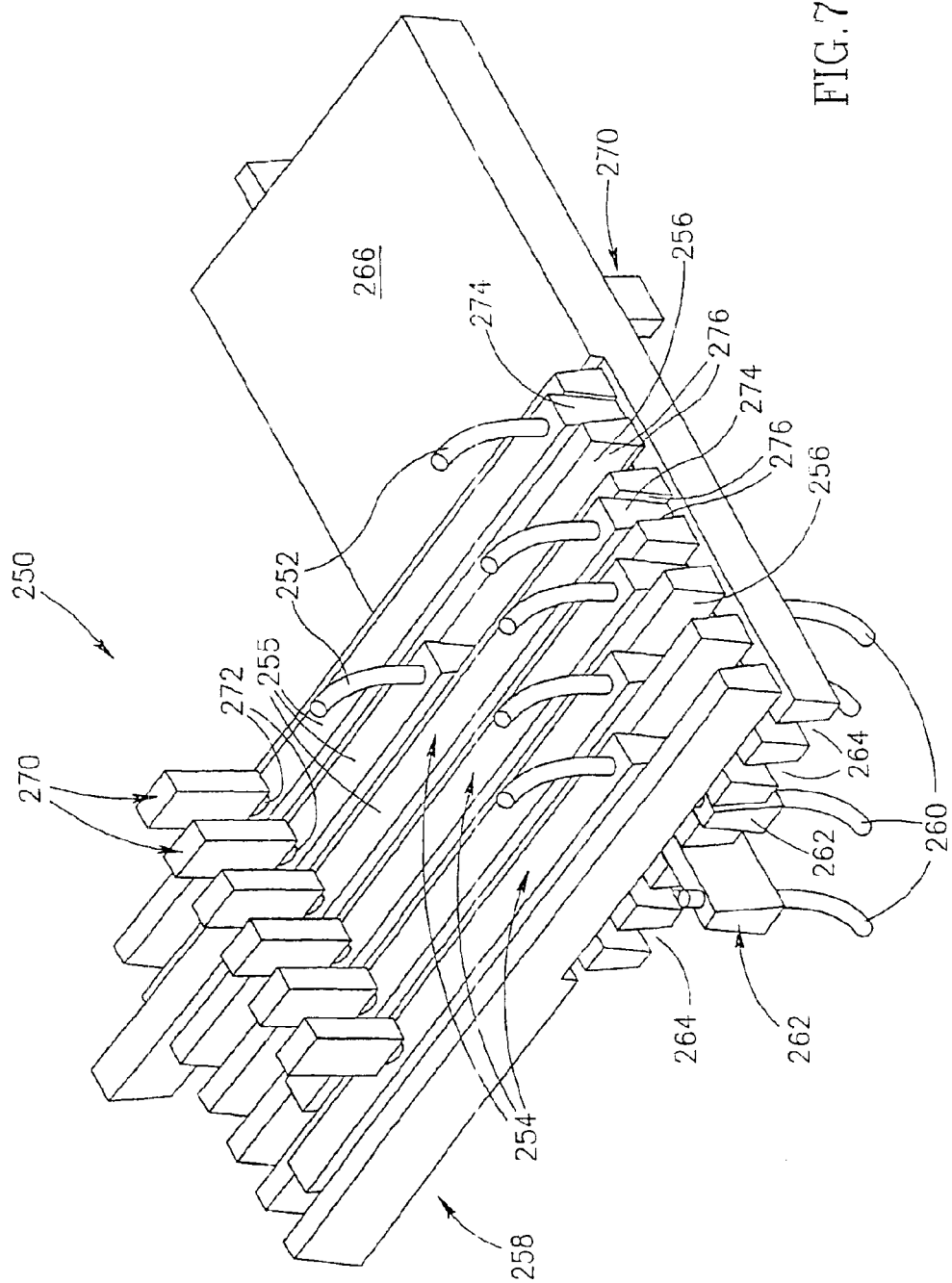
FIG. 7 schematically shows another crossbar switch suitable for fabrication using micromachining processes, in accordance with an embodiment of the present invention.

FIG. 7 schematically illustrates another crossbar switch 250 suitable for production using micromachining processes as well as conventional fabrication methods, in accordance with an embodiment of the present invention.

In crossbar switch 250, top fibers 252 are attached to "sliding shaft" transporters 254, each of which is mounted in a guide groove 256 formed in a top guide plate 258. Bottom fibers 260 are similarly attached to sliding shaft transporters 262 mounted in guide grooves 264 in a bottom guide plate 266. Optionally, top and bottom guide plates 258 and 266 are identical and guide grooves 256 are perpendicular to guide grooves 264. Identical features of guide plates 258 and 266 and associated components are described below with respect to guide plate 258.

Sliding shafts 254 and 262 are moved back and forth in their respective grooves 256 and 264 by suitable motors or actuators to align top fibers 252 with bottom fibers 260. In FIG. 7, by way of example, each sliding shaft 254 (and 262) is coupled to a piezoelectric motor 270 controllable to move the sliding shaft back and forth in its guide groove 254. Each piezoelectric motor 270 preferably comprises a friction nub 272 and is optionally coupled to sliding shaft 254 by having the friction nub resiliently pressed to an edge surface 255 of the shaft.

Preferably, each sliding shaft 254 has a trapezoidal cross section 274 and groove 256 in which the sliding shaft is mounted, preferably has a matching shape, with sidewalls 276 that are angled with respect to each other. Trapezoidal cross section 274 of sliding shafts 254 and matching shape of grooves 256 contribute to aligning sliding shafts 254 laterally.

Assume that top and bottom fibers 252 and 260 have a radius equal to about 50 microns and that sliding shafts 254 have a thickness of about 80 microns. If shafts 254 have a pitch of about 120 microns, a crossbar switch, in accordance with an embodiment of the present invention that can switch any of 1000 inputs to any of 1000 outputs would have a size of about 12 cm square.

Whereas sliding shafts 254 (and 262) are shown coupled to piezoelectric motors 270, other types of motors and various methods of coupling such motors to sliding shafts 254 may be used to move the shafts in grooves 256. For example, a rotary electric motor that "reels out" and "reels in" a thin flexible ribbon formed from steel or other suitable material can be used to move a sliding shaft 254. The ribbon may be attached to an end of sliding shaft 254 opposite the end to which its optic fiber 252 is attached and the ribbon reeled out and reeled in parallel to the shaft's groove.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. An optical crossbar switch comprising:
   a first plurality of first optic fibers having optical ends, each one of which optical ends is mounted to a different first moveable element;
   a second plurality of second optic fibers having optical ends, each one of which optical ends is mounted to a different second moveable element; and
   at least one motor controllable to translate each first moveable element and each second moveable element so as to align the optical end of any first fiber and the optical end of any second fiber adjacent to and facing each other.

2. An optical crossbar switch according to claim 1 wherein each first moveable element is mounted to a guide rail in a first array of first guide rails along which the first moveable element moves.

3. An optical crossbar switch according to claim 2 wherein each second moveable element is mounted to a guide rail in a second array of second guide rails along which the first moveable element moves.

4. An optical crossbar according to claim 3 wherein the first guide rails are rectilinear.

5. An optical crossbar according to claim 4 wherein the first array of guide rails is planar and the first guide rails are parallel.

6. An optical crossbar switch according to claim 5 wherein the planes of the first and second arrays of guide rails are parallel and the optical ends of the first and second fibers face the second and first rail arrays respectively.

7. An optical crossbar switch according to claim 6 wherein the first and second fibers are mounted to their respective moveable elements so that directions along which optical signals propagate after exiting optical ends of the fibers are substantially parallel.

8. An optical crossbar according to claim 7 wherein the first guide rails are angled with respect to the second guide rails so that a projection normal to the plane of the second guide rail array of any guide rail in the first guide rail array shadows each of the guide rails in the second guide rail array.

9. An optical crossbar according to claim 5 wherein the second guide rails are rectilinear.

10. An optical crossbar according to claim 9 wherein the second array of guide rails is planar and the second guide rails are parallel.

11. An optical crossbar switch according to claim 4 wherein each guide rail in the first guide rail array lies on a same cylindrical surface and the guide rail is parallel to the axis of rotation of the cylindrical surface.

12. An optical crossbar switch according to claim 11 wherein each second guide rail is an annulus having an axis of rotation that is coincident with the axis of rotation of the cylindrical surface.

13. An optical crossbar switch according to claim 12 and wherein all the annuli are the same size.

14. An optical crossbar according to claim 2 wherein the at least one motor comprises a motor mounted to each moveable element and wherein the motor applies force between the moveable element and its guide rail to move the moveable element along the guide rail.

15. An optical crossbar switch according to claim 14 wherein the at least one motor comprises a piezoelectric motor.

16. An optical crossbar switch according to claim 1 and comprising a controller that controls the at least one motor.

17. An optical crossbar switch according to claim 16 and comprising a position sensor for each moveable element that generates signals representing coordinates corresponding to positions of the moveable element and transmits the signals to the controller.

18. An optical crossbar switch according to claim 17 wherein the controller controls position of the moveable element responsive to the coordinate signals.

19. An optical crossbar switch according to claim 18 and comprising a memory.

20. An optical crossbar switch according to claim 19 wherein for each pair of first and second fibers, the memory is stored with position coordinates for the first and second moveable elements to which the fibers are respectively connected which position coordinates define positions for the movable elements for which the first and second fibers are substantially aligned.

21. An optical crossbar switch according to claim 20 wherein, to align a particular first fiber with a particular second fiber, the controller positions the moveable elements to which the particular fibers are mounted at positions corresponding to the coordinates stored in the memory for which the two particular fibers are substantially aligned.

22. An optical crossbar switch according to claim 21 and comprising a photosensor coupled to each first optic fiber that transmits signals responsive to intensity of light in the fiber to the controller.

23. An optical crossbar switch according to claim 22 wherein the controller controls the position of the first moveable element to which the first fiber is mounted responsive to signals received from the photosensor.

24. An optical crossbar switch according to claim 23 and comprising a photosensor coupled to each second optic fiber that transmits signals responsive to intensity of light in the fiber to the controller.

25. An optical crossbar switch according to claim 24 wherein the controller controls the position of the second moveable element to which the second fiber is mounted responsive to signals received from the photosensor.

26. An optical crossbar switch according to claim 22 wherein when the controller aligns a particular first fiber with a particular second fiber, the controller controls motion of a moveable element of at least one of the particular fibers responsive to signals from the photosensor attached to at least one of the particular fibers to optimize a position of at least one of the moveable elements so as to maximize a portion of light emitted from one of the fibers that is collected by the other fiber.

27. An optical crossbar switch according to claim 26 wherein if a coordinate of an optimum position for a moveable element to which one of the particular fibers is attached differs by an amount greater than a predetermined amount from a stored coordinate of the moveable element for which the particular fibers are aligned, the controller adjusts the stored coordinate responsive to the coordinate of the optimum position.

28. An optical crossbar switch according to claim 27 wherein the controller replaces the stored coordinate with the coordinate of the optimum position.

29. An optical crossbar switch according to claim 22 wherein when the controller aligns a particular first fiber with a particular second fiber, the controller uses signals from the photosensor attached to at least one of the particular fibers to determine a position of at least one of the moveable elements to which the particular fibers are attached so that a desired portion, less than a possible maximum, of light emitted from one of the fibers is collected by the other fiber.

30. An optical crossbar switch according to claim 1 wherein each first movable element comprises a slider mounted in a groove formed in a first surface along which groove the slider moves.

31. An optical crossbar switch according to claim 30 wherein each second movable element comprises a slider mounted in a groove formed in a second surface along which groove the slider moves.

32. An optical crossbar switch according to claim 31 wherein the first and second surfaces are planar parallel surfaces.

33. An optical crossbar switch according to claim 32 wherein the grooves in the first and second surfaces are rectilinear.

34. An optical crossbar switch according to claim 33 wherein the grooves in a same surface are parallel and wherein the grooves in the first surface are angled with respect to the grooves in the second surface so that a projection normal to the second surface of any groove in the first surface shadows each of the grooves in the second surface.

35. An optical crossbar switch according to claim 34 comprising a linear gear positioned near and parallel to each groove.

36. An optical crossbar switch according to claim 35 wherein the at least one motor comprises a motor mounted to each slider, said motor having a gear that engages the linear gear so that when the motor rotates the gear, the slider moves along the groove.

37. An optical crossbar switch according to claim 34 wherein the grooves in the first surface are orthogonal to the grooves in the second surface.

38. An optical crossbar switch according to claim 30 wherein the slider comprises a thin rectangular plate having long and short edges and two planar face surfaces.

39. An optical crossbar switch according to claim 38 and wherein the at least one motor comprises a piezoelectric motor coupled to a long edge surface of the plate.

40. An optical crossbar switch according to claim 1 wherein the at least one motor and first and second moveable elements are fabricated using micromachining techniques.

41. An optical crossbar switch according to claim 40 wherein a maximum dimension of the at least one motor is less than 300 microns.

42. An optical crossbar switch according to claim 40 wherein a maximum dimension of the first and second moveable elements perpendicular to their directions of motion are less than 300 microns.

43. An optical crossbar switch according to claim 1 wherein when the optical end of a first fiber is aligned adjacent to and facing the optical end of a second fiber the at least one motor is controllable to translate at least one of the optical ends towards and away from the other optical end.

44. An optical crossbar switch according to claim 43 wherein the at least one motor is controllable to translate at least one of the optical ends of the aligned first and second fibers so that the optical ends are substantially touching.

45. An optical crossbar switch according to claim 1 wherein the optical ends of the fibers are lensed.

46. An optical crossbar switch according to claim 1 and comprising a lens for each pair of fibers comprising a first fiber and a second fiber, which lens is located between positions of the optical ends of the fibers at which the optical ends of the fibers are aligned facing each other.

47. An optical crossbar switch according to claim 1 wherein the at least one motor is controllable to move the optical end of any first fiber relative to the optical end of any second fiber from a position at which the optical end of the first fiber is not adjacent to the optical end of the second fiber to a position at which the optical ends of the two fibers are adjacent.

48. An optical crossbar switch comprising:
   a first plurality of first optic fibers having optical ends, each one of which optical ends is mounted to a different first micromachined moveable element;
   a second plurality of second optic fibers having optical ends, each one of which optical end is mounted to a different second micromachined moveable element; and
   at least one micromachined motor controllable to translate each first moveable element and each second moveable element so as to align the optical end of any first fiber and the optical end of any second fiber adjacent to and facing each other.

* * * * *